(12) United States Patent
Trinh

(10) Patent No.: US 12,073,451 B2
(45) Date of Patent: Aug. 27, 2024

(54) SYSTEMS FOR E-COMMERCE RECOMMENDATIONS

(71) Applicant: ONLINE MOBILE SERVICES JOINT STOCK COMPANY, Ho Chi Minh City (VN)

(72) Inventor: Tuan Xuan Trinh, Hanoi (VN)

(73) Assignee: ONLINE MOBILE SERVICES JOINT STOCK COMPANY, Ho Chi Minh City (VN)

(*) Notice: Subject to any disclaimer, the term of this patent is extended or adjusted under 35 U.S.C. 154(b) by 0 days.

(21) Appl. No.: 17/327,665

(22) Filed: May 21, 2021

(65) Prior Publication Data
US 2021/0390609 A1 Dec. 16, 2021

Related U.S. Application Data

(60) Provisional application No. 63/038,742, filed on Jun. 12, 2020.

(51) Int. Cl.
G06Q 30/0601 (2023.01)
G06F 16/9535 (2019.01)
G06N 3/08 (2023.01)

(52) U.S. Cl.
CPC ..... *G06Q 30/0631* (2013.01); *G06F 16/9535* (2019.01); *G06N 3/08* (2013.01); *G06Q 30/0641* (2013.01)

(58) Field of Classification Search
CPC ........................................ G06Q 30/0601–0645
(Continued)

(56) References Cited

U.S. PATENT DOCUMENTS

2018/0211164 A1* 7/2018 Bazrafkan ............... G06N 3/088
2018/0218429 A1* 8/2018 Guo ....................... G06V 30/194
(Continued)

OTHER PUBLICATIONS

Dtex systems named "user behavior analytics platform of the year" in 2017 CyberSecurity breakthrough awards. (Sep. 13, 2017). Internet Wire Retrieved from https://dialog.proquest.com/professional/docview/1940219099?accountid=131444 (Year: 2017).*
(Continued)

*Primary Examiner* — Jeffrey A. Smith
*Assistant Examiner* — Ashley D Preston
(74) *Attorney, Agent, or Firm* — GRAESER ASSOCIATES INTERNATIONAL INC.; D'vorah Graeser

(57) ABSTRACT

A system and method for recommendations for online e-commerce to a user, which provide a number of different methods for surfacing a current desire or need of the user in terms of a purchase, through a recommendation engine that applies one or more neural net models. One non-limiting example of such a method is to apply a first model for analyzing the current online behavior of the user, and a second model for analyzing past online behavior of the user, then concatenating the outputs of both models to a single output, to determine a recommendation for the user. The two models may be of the same or different type. For example and without limitation, the first model may comprise a CNN, while the second model may comprise a CNN and/or a transformer-based model. The transformer-based model may comprise an encoder alone, rather than the art-known combination of an encoder and a decoder. If the model comprises a CNN, preferably the CNN features a plurality of overlapping filters of different shapes. Optionally the CNN comprises a single convolutional layer. Optionally each such model may comprise a plurality of different models. Optionally the recommendation engine may also comprise another
(Continued)

type of AI or machine learning algorithm, in addition to one or more neural net models.

28 Claims, 13 Drawing Sheets

(58) Field of Classification Search
USPC .............................................. 705/26.1–27.2
See application file for complete search history.

(56) References Cited

U.S. PATENT DOCUMENTS

| | | | | |
|---|---|---|---|---|
| 2019/0147366 | A1* | 5/2019 | Sankaran | G06N 3/04 |
| | | | | 706/12 |
| 2019/0205766 | A1* | 7/2019 | Krebs | G06V 10/75 |
| 2019/0220694 | A1* | 7/2019 | Biswas | G06V 10/751 |
| 2019/0236680 | A1* | 8/2019 | Kounine | G06N 20/00 |
| 2019/0362220 | A1* | 11/2019 | Yap | G06N 3/063 |
| 2020/0005151 | A1* | 1/2020 | Jiang | G06N 3/04 |
| 2021/0064965 | A1* | 3/2021 | Pardeshi | A63F 13/67 |
| 2021/0141997 | A1* | 5/2021 | Pinnamaneni | G06F 40/106 |
| 2021/0255862 | A1* | 8/2021 | Volkovs | G06F 9/3555 |

OTHER PUBLICATIONS

3D Convolutional Networks for Session-based Recommendation with Content Features, Trinh Xuan Tuan and Tu Minh Phuong, RecSys (ACM Recommender Systems) 2017, Aug. 27, 2017.
A Sensitivity Analysis of (and Practitioners' Guide to) Convolutional Neural Networks for Sentence Classification, Ye Zhang and Byron Wallace, arXiv:1510.03820, Oct. 13, 2015.
A Simple Convolutional Generative Network for Next Item Recommendation, Yuan et al, arXiv:1808.05163, Nov. 29, 2018.
Amazon.com Recommendations: Item-to-Item Collaborative Filtering, Linden et al, IEEE Distributed Syst. Online, 2003.
Attention Is All You Need, Vaswani et al, 31st Conference on Neural Information Processing Systems (NIPS 2017), Dec. 4, 2017.
Convolutional Neural Networks for Sentence Classification, Yoon Kim, EMNLP 2014, Conference on Empirical Methods in Natural Language Processing, Oct. 25, 2014.
CosRec: 2D Convolutional Neural Networks for Sequential Recommendation, Yan et al, CIKM-2019, ACM International Conference on Information and Knowledge Management, arXiv:1908.09972, Aug. 27, 2019.
CS231n Convolutional Neural Networks for Visual Recognition, https://cs231n.github.io/convolutional-networks/; 2014 by Stanford University.
Deep Neural Networks for YouTube Recommendations, Covington et al, Proceedings of the 10th ACM Conference on Recommender Systems, Sep. 7, 2016.
Parallel Recurrent Neural Network Architectures for Feature-rich Session-based Recommendations, Hidasi et al, RecSys (ACM Recommender Systems) 2016, Sep. 15, 2016.
Personalized Top-N Sequential Recommendation via Convolutional Sequence Embedding, Jiaxi Tang and Ke Wang, arXiv:1809.07426, Sep. 19, 2018.
Session-Based Recommendations With Recurrent Neural Networks, Hidasi et al, ICLR (International Conference on Learning Representations) 2016, May 2, 2016.
Yin et al, Comparative Study of CNN and RNN for Natural Language Processing, arXiv:1702.01923v1, Feb. 7, 2017.

* cited by examiner

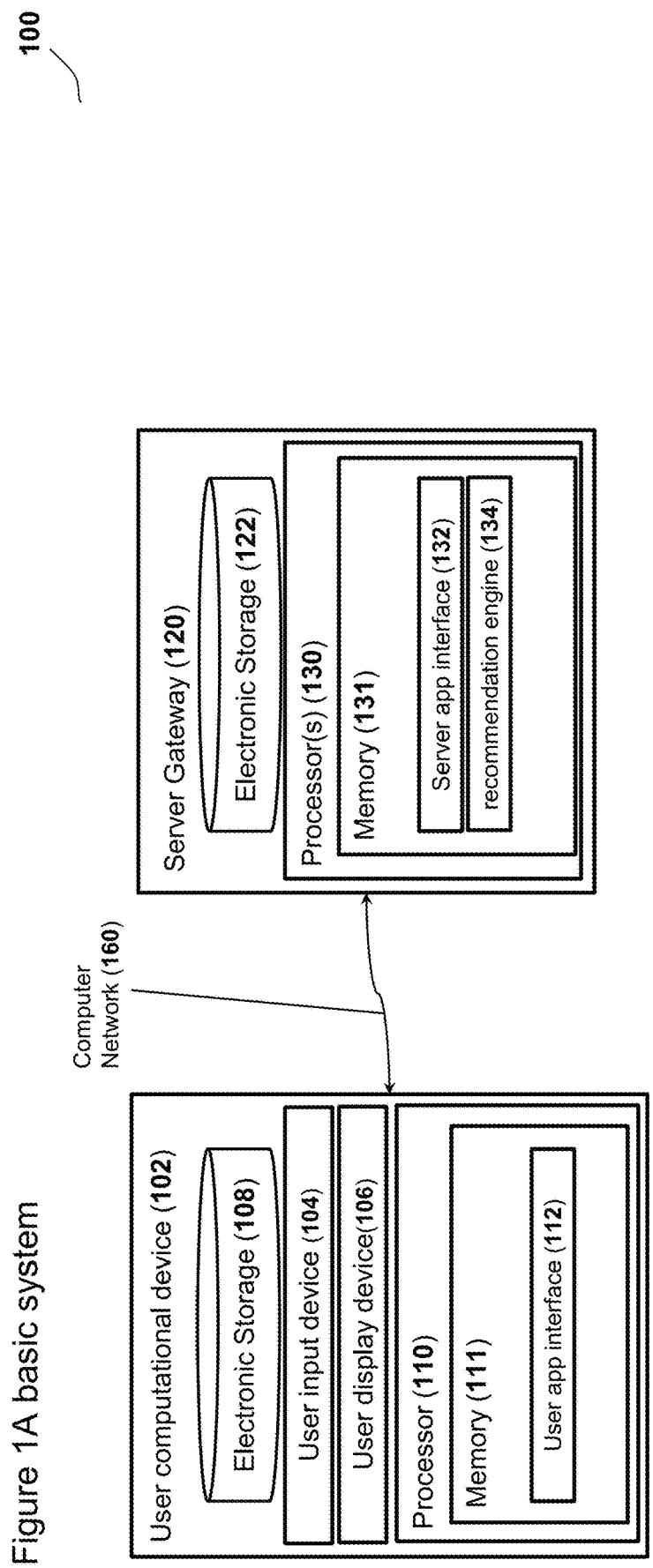
Figure 1A basic system

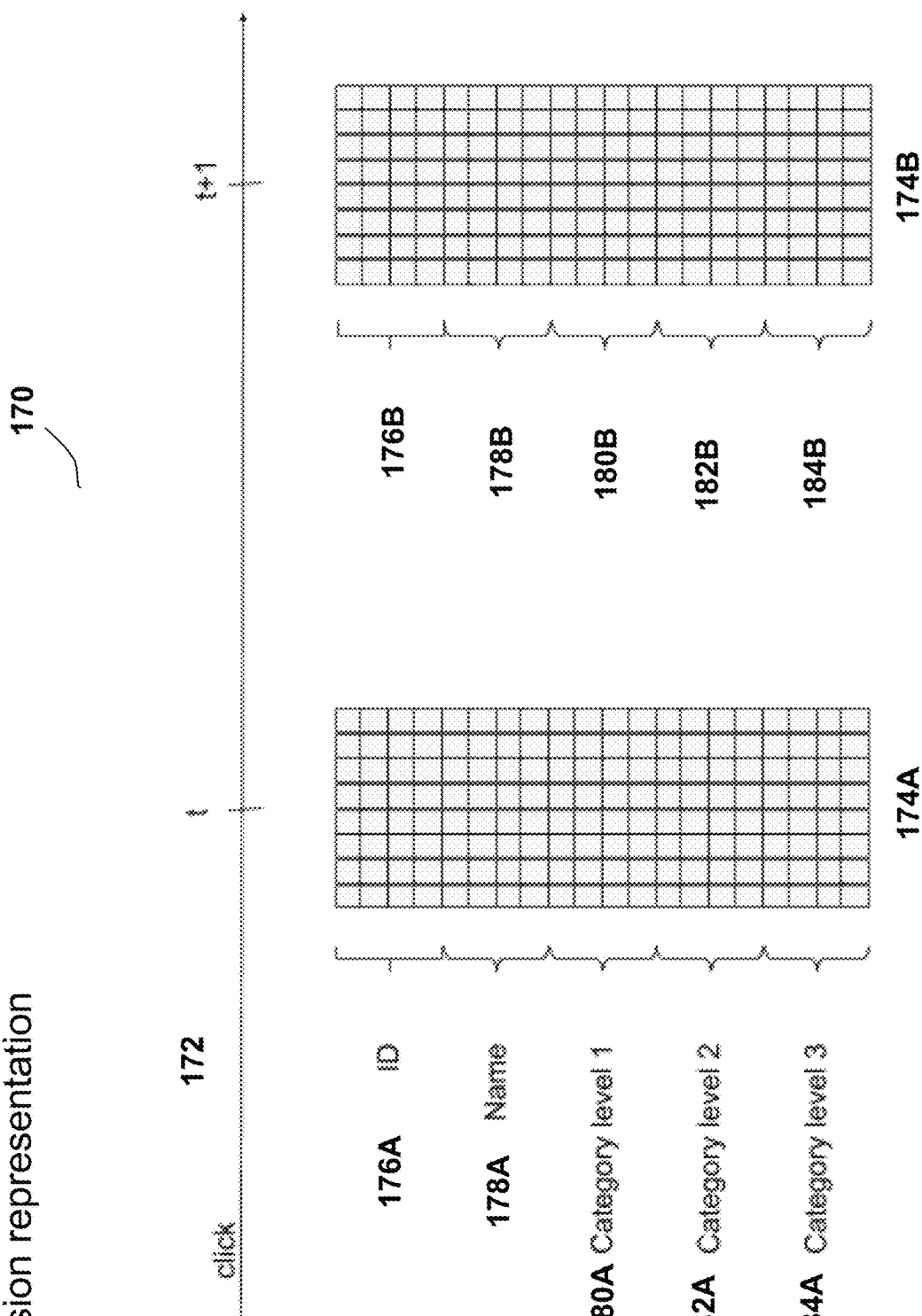

SYSTEMS FOR E-COMMERCE RECOMMENDATIONS

FIELD OF THE INVENTION

The present invention is of a system and method for e-commerce recommendations, and in particular, of such a system and method for analyzing such recommendations based on a plurality of factors.

BACKGROUND OF THE INVENTION

Recommending goods and/or services to users of online purchasing systems can be problematic. A user may have particular preferences that may be determined based upon past purchases, yet at any particular moment may be seeking a different good or service. In order to handle vast volumes of online purchases, recommendation systems have been developed. These systems seek to locate a good or service that the user would like to purchase now. To help surface newly desired goods or services, of which the user may not have been aware, actions of other users may also be included to assist such a system. But such inclusion may mask the actual current desire of the user. Furthermore, such systems may become unwieldy, due to excessively complicated models and too many inputs.

BRIEF SUMMARY OF THE INVENTION

The present invention overcomes the drawbacks of the background art by providing a system and method for recommendations for online e-commerce to a user, which provide a number of different methods for surfacing a current desire or need of the user in terms of a purchase, through a recommendation engine that applies one or more neural net models. The recommendation engine may recommend an item, whether a good and/or a service, an action or display content which may then invoke an action by the user. The recommendation engine preferably features user behavioral logging, for example of behaviors exhibited by the user during a session between the user computational device and the server.

One non-limiting example of such a method is to apply a first model for analyzing the current online behavior of the user, and a second model for analyzing past online behavior of the user, then concatenating the outputs of both models to a single output, to determine a recommendation for the user. The two models may be of the same or different type. For example and without limitation, the first model may comprise a CNN, while the second model may comprise a CNN and/or a transformer-based model. The transformer-based model may comprise an encoder alone, rather than the art-known combination of an encoder and a decoder. If the model comprises a CNN, preferably the CNN features a plurality of overlapping filters of different shapes. Optionally the CNN comprises a single convolutional layer. Optionally each such model may comprise a plurality of different models. Optionally the recommendation engine may also comprise another type of AI or machine learning algorithm, in addition to one or more neural net models.

By "e-commerce" it is meant any online system for purchasing goods and/or services, including but not limited online marketplaces, as well as systems for purchasing physical goods, digital goods, media and other content, and services, whether provided digitally or physically.

Implementation of the method and system of the present invention involves performing or completing certain selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Unless otherwise defined, all technical and scientific terms used herein have the same meaning as commonly understood by one of ordinary skill in the art to which this invention belongs. The materials, methods, and examples provided herein are illustrative only and not intended to be limiting.

An algorithm as described herein may refer to any series of functions, steps, one or more methods or one or more processes, for example for performing data analysis.

Implementation of the apparatuses, devices, methods and systems of the present disclosure involve performing or completing certain selected tasks or steps manually, automatically, or a combination thereof. Specifically, several selected steps can be implemented by hardware or by software on an operating system, of a firmware, and/or a combination thereof. For example, as hardware, selected steps of at least some embodiments of the disclosure can be implemented as a chip or circuit (e.g., ASIC). As software, selected steps of at least some embodiments of the disclosure can be implemented as a number of software instructions being executed by a computer (e.g., a processor of the computer) using an operating system. In any case, selected steps of methods of at least some embodiments of the disclosure can be described as being performed by a processor, such as a computing platform for executing a plurality of instructions.

Software (e.g., an application, computer instructions) which is configured to perform (or cause to be performed) certain functionality may also be referred to as a "module" for performing that functionality, and also may be referred to a "processor" for performing such functionality. Thus, processor, according to some embodiments, may be a hardware component, or, according to some embodiments, a software component.

Further to this end, in some embodiments: a processor may also be referred to as a module; in some embodiments, a processor may comprise one or more modules; in some embodiments, a module may comprise computer instructions— which can be a set of instructions, an application, software—which are operable on a computational device (e.g., a processor) to cause the computational device to conduct and/or achieve one or more specific functionality.

Some embodiments are described with regard to a "computer," a "computer network," and/or a "computer operational on a computer network." It is noted that any device featuring a processor (which may be referred to as "data processor"; "pre-processor" may also be referred to as "processor") and the ability to execute one or more instructions may be described as a computer, a computational device, and a processor (e.g., see above), including but not limited to a personal computer (PC), a server, a cellular telephone, an IP telephone, a smart phone, a PDA (personal digital assistant), a thin client, a mobile communication device, a smart watch, head mounted display or other wearable that is able to communicate externally, a virtual or cloud based processor, a pager, and/or a similar device. Two or more of such devices in communication with each other may be a "computer network."

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

FIG. 1A illustrates a system 100 configured for providing a recommendation to a buyer according to one or more actions taken by the buyer in a buying session, in relation to information provided by a seller for one or more products or services, in accordance with one or more implementations of the present invention;

FIG. 1B shows a non-limiting, exemplary session representation;

DESCRIPTION OF AT LEAST SOME EMBODIMENTS

Figure 2:
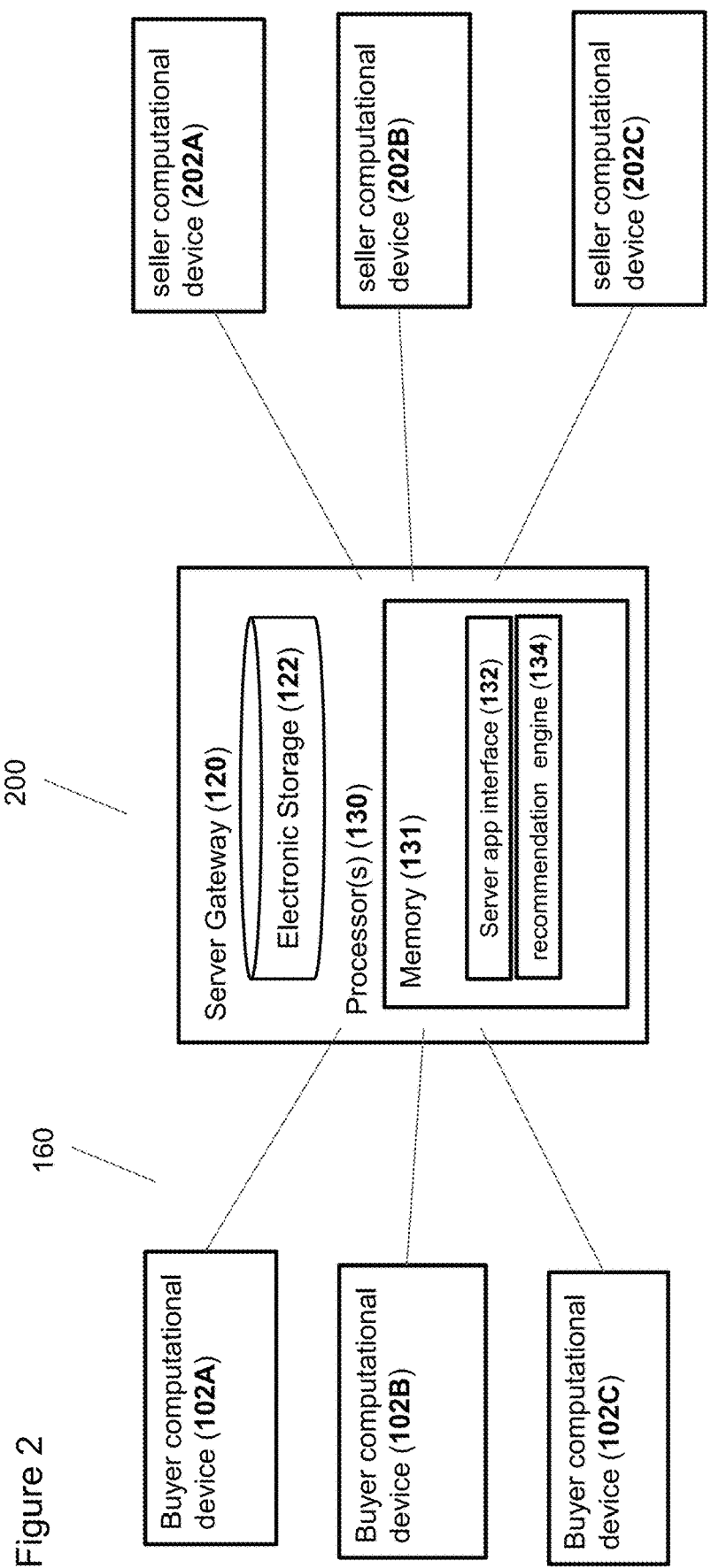
FIG. 2 shows a non-limiting, exemplary system for supporting communication between a plurality of buyers, and a plurality of seller(s)

The present invention, in at least some embodiments, relates to a system and method for providing one or more buyer recommendations through an AI model, according to one or more products or services offered for sale by a seller. The buyer recommendations may relate to the actions of a buyer in a single session or across multiple sessions. Optionally, previous buyer behavior such as purchases and/or a profile may be included. The profile of the user may include for example demographic information such as age, gender identification, birthday and more; geographical location; user preferences for purchases, communication and more; and/or user interests. An AI model may include machine learning and/or deep learning algorithms. The inputs from the buyer and seller may be obtained in any suitable manner, including but not limited to written text, such as a document, or audio information. The audio information is preferably converted to text before analysis.

By "buyer" it is meant any purchaser or consumer of goods or services, or any person seeking a particular role (such as a person seeking employment, for example). By "seller" it is meant any purveyor of goods or services, or any entity providing a particular role (such as an employer seeking an employee, for example).

By "document", it is meant any text featuring a plurality of words. The algorithms described herein may be generalized beyond human language texts to any material that is susceptible to tokenization, such that the material may be decomposed to a plurality of features.

Various methods are known in the art for tokenization. For example and without limitation, a method for tokenization is described in Laboreiro, G. et al (2010, Tokenizing microblogging messages using a text classification approach, in 'Proceedings of the fourth workshop on Analytics for noisy unstructured text data', ACM, pp. 81-88).

Once the document has been broken down into tokens, optionally less relevant or noisy data is removed, for example to remove punctuation and stop words. A non-limiting method to remove such noise from tokenized text data is described in Heidarian (2011, Multi-clustering users in twitter dataset, in 'International Conference on Software Technology and Engineering, 3rd (ICSTE 2011)', ASME Press). Stemming may also be applied to the tokenized material, to further reduce the dimensionality of the document, as described for example in Porter (1980, 'An algorithm for suffix stripping', Program: electronic library and information systems 14(3), 130-137).

The tokens may then be fed to an algorithm for natural language processing (NLP) as described in greater detail below. The tokens may be analyzed for parts of speech and/or for other features which can assist in analysis and interpretation of the meaning of the tokens, as is known in the art.

Alternatively or additionally, the tokens may be sorted into vectors. One non-limiting example of a method for converting words as tokens to vectors is word2vec, which produces vectors of words from text, known as word embeddings. Word2vec has a disadvantage in that transfer learning is not operative for this algorithm. Rather, the algorithm needs to be trained specifically on the lexicon (group of vocabulary words) that will be needed to analyze the documents. Another non-limiting example of a pre-training model for creating such vectors is by using BERT (Bidirectional Encoder Representations from Transformers). While algorithms such as word2vec generate a single word embedding representation for each word in the vocabulary, BERT is bidirectional which results in improved performance.

Another method for assembling such vectors is through the Vector Space Model (VSM). Various vector libraries may be used to support various types of vector assembly methods, for example according to OpenGL. The VSM method results in a set of vectors on which addition and scalar multiplication can be applied, as described by Salton & Buckley (1988, 'Term-weighting approaches in automatic text retrieval', Information processing & management 24(5), 513-523).

To overcome a bias that may occur with longer documents, in which terms may appear with greater frequency due to length of the document rather than due to relevance, optionally the vectors are adjusted according to document length. Various non-limiting methods for adjusting the vectors may be applied, such as various types of normalizations, including but not limited to Euclidean normalization (Das et al., 2009, 'Anonymizing edge-weighted social network graphs', Computer Science, UC Santa Barbara, Tech. Rep. CS-2009-03); or the TF-IDF Ranking algorithm (Wu et al, 2010, Automatic generation of personalized annotation tags for twitter users, in 'Human Language Technologies: The 2010 Annual Conference of the North American Chapter of the Association for Computational Linguistics', Association for Computational Linguistics, pp. 689-692).

Optionally the tokens may correspond directly to data components, for use in data analysis as described in greater detail below. The tokens may also be combined to form one or more data components, for example according to the type of information requested. For example, a sequence of buyer inputs may be analyzed to determine a recommendation for the next item in the sequence. Preferably such a determination of a direct correspondence or of the need to combine tokens for a data component is determined according to natural language processing.

Turning now to the drawings, FIG. 1A illustrates a system 100 configured for providing a recommendation to a buyer according to one or more actions taken by the buyer in a buying session, in relation to information provided by a seller for one or more products or services, in accordance with one or more implementations of the present invention.

In some implementations, the system 100 may include a user computational device 102 and a server gateway 120 that communicates with the user computational device through a computer network 160, such as the internet. ("Server gateway" and "server" are equivalent and may be used interchangeably). The user may access the system 100 via user computational device 102.

The user computational device 102 features a user input device 104, a user display device 106, an electronic storage 108 (or user memory), and a processor 110 (or user processor). The user computational device 102 may optionally comprise one or more of a desktop computer, laptop, PC, mobile device, cellular telephone, and the like.

The user input device 104 allows a user to interact with the computational device 102. Non-limiting examples of a user input device 104 are a keyboard, mouse, other pointing device, touchscreen, and the like.

The user display device 106 displays information to the user. Non-limiting examples of a user display device 106 are computer monitor, touchscreen, and the like.

The user input device 104 and user display device 106 may optionally be combined to a touchscreen, for example.

The electronic storage 108 may comprise non-transitory storage media that electronically stores information. The electronic storage media of electronic storage 108 may include one or both of system storage that is provided integrally (i.e., substantially non-removable) with a respective component of system 100 and/or removable storage that is removably connected to a respective component of system 100 via, for example, a port (e.g., a USB port, a firewire port, etc.) or a drive (e.g., a disk drive, etc.). The electronic storage 108 may include one or more of optically readable storage media (e.g., optical discs, etc.), magnetically readable storage medium (e.g., flash drive, etc.), and/or other electronically readable storage medium. The electronic storage 108A may include one or more virtual storage resources (e.g., cloud storage, a virtual private network, and/or other virtual storage resources). The electronic storage 108 may store software algorithms, information determine by processor, and/or other information that enables components of a system 100 to function as described herein.

The processor 110 refers to a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

The processor 110 is configured to execute readable instructions from a memory 111. The computer readable instructions in memory 111 include instructions for operating a user app interface 104, and/or other components.

The user app interface 104 provides a user interface presented via the user computational device 102. The user input device 104 may be a graphical user interface (GUI). The user input device may provide information to the user. In some implementations, the user input device may present information associated with one or more transactions. The user input device may receive information from the user. In some implementations, the user input device may receive user instructions to perform a transaction. The user instructions may include a selection of a transaction, a command to perform a transaction, and/or information associated with a transaction.

Referring now to server gateway 120, the server gateway 120 communicates with the user computational device 102. The server gateway 120 facilitates the transfer of information to and from the user, through user computational device 102. In some implementations, the system 100 may include one or more server gateways 120.

The server gateway 120 features an electronic storage 122 (or server memory), one or more processor(s) 130 (or server processor), machine readable instructions in a memory 131, and a server app interface 132 and/or other components. The server gateway 120 may include a plurality of hardware, software, and/or firmware components operating together to provide the functionality attributed herein to server gateway 120.

The electronic storage 122 may comprise non-transitory storage media that electronically stores information. The electronic storage media of electronic storage 122 may include one or both of system storage that is provided integrally (i.e., substantially non-removable) with a respective component of system 100 and/or removable storage that is removably connected to a respective component of system 100 via, for example, a port (e.g., a USB port, a firewire port, etc.) or a drive (e.g., a disk drive, etc.). The electronic storage 122 may include one or more of optically readable storage media (e.g., optical discs, etc.), magnetically readable storage medium (e.g., flash drive, etc.), and/or other electronically readable storage medium. The electronic storage 122 may include one or more virtual storage resources (e.g., cloud storage, a virtual private network, and/or other virtual storage resources). The electronic storage 122 may store software algorithms, information determine by processor, and/or other information that enables components of a system 100 to function as described herein.

The processor 130 may be configured to provide information processing capabilities in server gateway 120. As such, the processor 130 may include a device or combination of devices having circuitry used for implementing the communication and/or logic functions of a particular system. For example, a processor may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processor may further include functionality to operate one or more software programs based on computer-executable program code thereof, which may be stored in a memory. As the phrase is used herein, the processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

The processor 130 is configured to execute machine-readable instructions stored in memory 131. The machine-readable instructions in memory 131 preferably include instructions for executing server app interface 132, and/or other components. Server app interface 132 supports communication between server gateway 120 and each of user computational device 102. The machine readable instructions also preferably include instructions for executing a recommendation engine 134, which may include any of the functions and processes described in greater detail below, including but not limited to any AI or deep learning functions, or a plurality thereof.

Recommendation engine 134 preferably receives information from user computational device 102 as part of a session, and then determines a recommendation for a next item to consider as part of that session. The recommendation may be performed with regard to keywords, or alternatively or additionally through an AI or deep learning function.

For example, recommendation engine 134 receives information from a user who is a buyer online, and who wishes to receive a good or service. Recommendation engine 134 then seeks a proposed recommendation which will interest that buyer, also as described in greater detail below. Information from previously interactions with user computational device 102 and/or a user identified according to a user profile (whether using the same or a different computational device) may also be combined with current information received from user computational device 102 and/or the user.

FIG. 1B shows a non-limiting, exemplary session representation, according to which recommendation engine 134 may operate. Each session is preferably represented as a character model to represent information such as: the item id (identifier), the item name and the item categories. Each item may for example represent a good and/or service with which the buyer (user) interacted during the session, whether by clicking on the item, staying on a page showing the item (or a collection of such items), placing the item in a shopping cart, indicating the item for a wish list or otherwise for future access (short of purchase) and so forth. Other actions may also be taken. For example, when the buyer clicks on a specific category page or other category grouping, then the item categories include this specific category's name; the item id and the item name are both NULL. As another example, when the buyer performs a search through the website, app or other software supported by the system of FIG. 1A, the item name includes the keywords; the item id and the item categories are NULL. In the case of performing such a search, the search is preferably performed through content provided by the server to the user computational device, and specifically to the user interface of the user computational device. The character model may be implemented as described for example in the paper by Trinh Xuan Tuan and Tu Minh Phuong (3D Convolutional Networks for Session-based Recommendation with Content Features. RecSys 2017).

Using a character model to represent a sentence is preferred as it is a compact representation, in comparison with word-based sentence representations, because the dictionary size is huge, normally >100,000 words. If the representation were to use one hot encoding for a word-based representation for example, for a sentence that has 5 words, a dictionary of five times that size is required to represent the sentence. One common way to reduce the size is to use embedding words. However, this approach often requires large amounts of data to learn the recommendations through a word embedding, sentence representation. In this case, the representation is preferably applied to a single session, which may not feature any prior knowledge about the behavior of the buyer. In addition, representing all features at character level removes the need of time consuming feature engineering and can be applied for different types of features.

Preferably, each category into which an item may be placed is considered, at each different level, as a single feature to be represented. By 'different level' it is meant that the categories are organized hierarchically. The hierarchical level may be determined through machine learning but is preferably set by the seller of the good and/or service, and/or by the operator of the server of FIG. 1A (which may be an e-commerce marketplace, media or content marketplace, and the like).

As a result, the representation for each session has the format as shown as a session structure 170, featuring a plurality of buyer actions 172 that are performed sequentially over time as part of the buyer's session. For this non-limiting example, buyer actions 172 are shown as clicks but as noted above, any suitable action may be included. Buyer actions 172 are shown as occurring at time t and then at time t+1, as the session proceeds. A first action 172 results in the identification of an associated item 174A, while a second action 172 results in the identification of an associated item 174B. Each item 174A or 174B has an id 176A or 176B, a name 178A or 178B, and a plurality of category levels, shown as category levels 180A or 180B, 182A or 182B, or 184A or 184B. This structure may be used with the recommendation engine as described herein, including with regard to the AI models described in greater detail below. For an AI model which uses filters, the representation may be used to create multiple overlapping filters, as described with regard to FIG. 6 below.

FIG. 2 shows a non-limiting, exemplary system for supporting communication between a plurality of buyers, and a plurality of seller(s). As shown, a system 200 features a plurality of buyer computational devices 102, shown as devices 102A-102C for the purpose of illustration only and without any intention of being limiting. Buyer computational devices 102A-102C communicate with server gateway 120, with functions as previously described in FIG. 1A. Server gateway 120 also communicates with a plurality of sellers through their respective computational devices, shown as seller computational device 202A-202C. The presence of other seller computational devices are optional.

Server gateway 120 starts a commerce session with the buyer through buyer computational devices 102A-102C. Server gateway 120 is then able to analyze the actions of the buyer during the session, and to suggest an appropriate good or server from any appropriate sellers, through the actions of a recommendation engine 134. If the buyer indicates a desire to purchase during the session, through buyer computational device 102, then server gateway 120 preferably initiates a secure session between one of the buyer computational devices 102A-102C and the appropriate seller computational device 202.

System 200 may therefore feature a marketplace, with multiple buyers and sellers, and may provide information from seller computational device 202, regardless of whether a secure session with buyer computational device 102 is initiated. A particular seller computational device 202 may be selected according to a match determined by server gateway 120 and/or financial or other considerations.

Recommendation engine 134 may also incorporate information from previous buyer sessions, whether with the specific buyer computational device 102 (or with the specific buyer using a different computational device), or with such a session from a different buyer computational device 102. Recommendation engine 134 may also incorporate information from a buyer's profile or other information that is available about that specific buyer or another buyer, according to sessions through buyer computational device 102.

Figure 3:
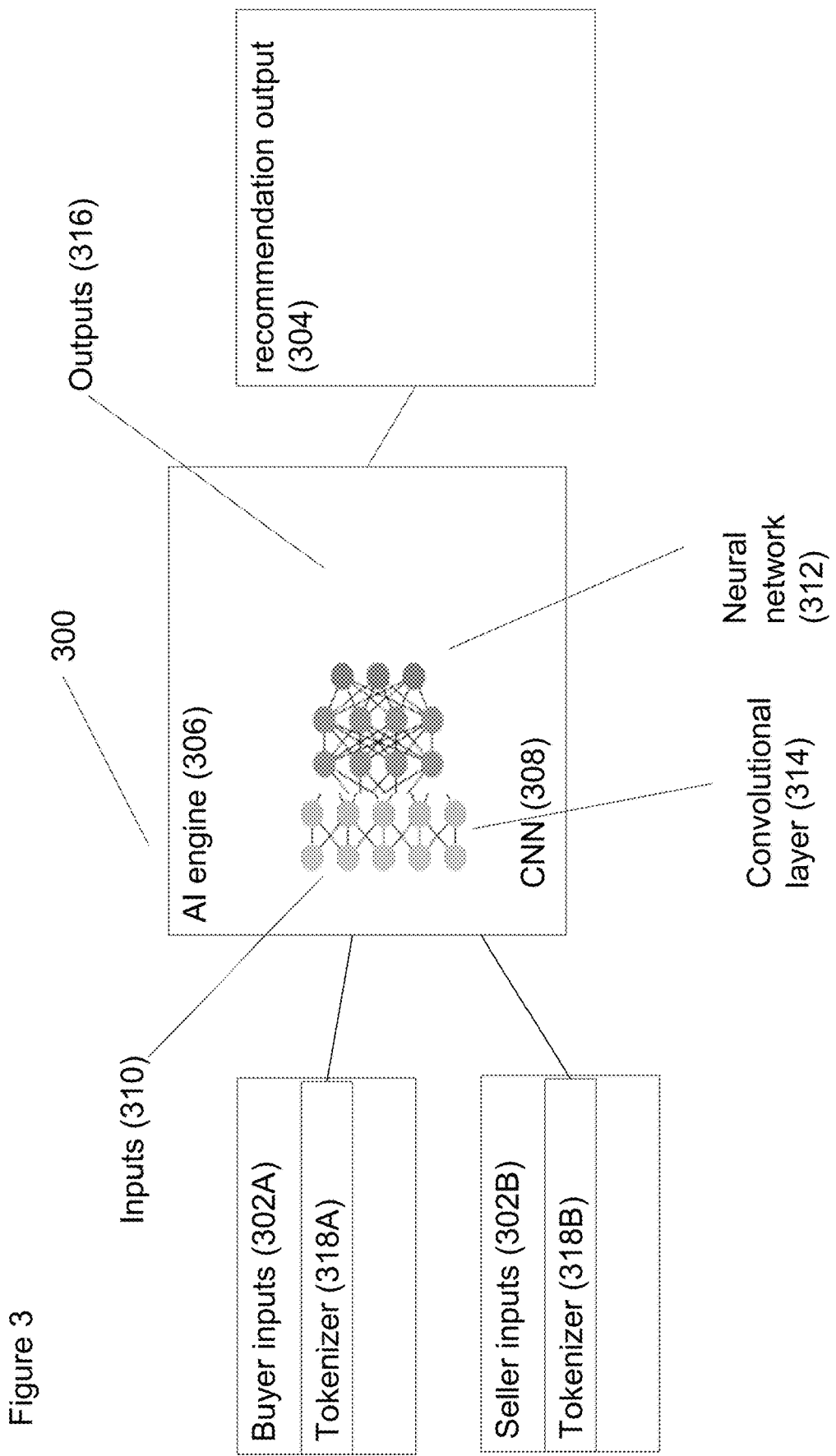
FIG. 3 relates to a non-limiting exemplary systems for providing inputs from the parties to an artificial intelligence system with specific models employed, and then analyzing it to determine a next recommendation.

FIG. 3 relates to a non-limiting exemplary systems for providing inputs from the parties to an artificial intelligence system with specific models employed, and then analyzing it to determine a next recommendation.

Such artificial intelligence systems may for example be incorporated into the previously described recommendation engine of FIGS. 1A and 2. Turning now to FIG. 3 as shown in a system 300, a buyer data interface 302A and an seller data interface 302B provide text inputs that preferably are also analyzed with the tokenizers in 318A and 318B. A tokenizer is able to break down the text inputs into parts of speech. It is preferably also able to stem the words. For example, running and runs could both be stemmed to the word run. This tokenizer information is then fed into an AI engine in 306 and a match output 304 is provided by the AI engine. The match output 304 preferably indicates which seller is to be associated with which buyer, by indicating a match through buyer data interfaces 302A and seller data interface 302B.

In this non-limiting example, AI engine 306 comprises a Convolutional Neural Network (CNN) 308. CNN 308 features input neurons 310, processing through neural network 314 and then outputs 316. A CNN is a type of neural network that features additional separate convolutional layers for feature extraction, in addition to the neural network layers for classification/identification. Overall, the layers are organized in 3 dimensions: width, height and depth. Further, the neurons in one layer do not connect to all the neurons in the next layer but only to a small region of it. Lastly, the final output will be reduced to a single vector of probability scores, organized along the depth dimension. It is often used for audio and image data analysis, but has recently been also used for natural language processing (NLP; see for example Yin et al, Comparative Study of CNN and RNN for Natural Language Processing, arXiv:1702.01923v1 [cs.CL] 7 Feb. 2017).

CNNs have recently achieved remarkably strong performance on the practically important task of session-based recommendation. Optionally, CNN 308 may use entire sequences of session click IDs, but preferably CNN 308 instead features deep 3D convolutional neural networks with 13 layers, to incorporate both ID information and textual features such as item's name, item's categories. By leveraging more textual meta-data, this method suffers less from cold start user problems and it achieves the state-of-the-art performance on different vertical business domain data. The common strategy in CNN, especially on visual data is that more and more layers will be added to find the feature map representation. However, these deep models require practitioners to specify an exact model architecture and set accompanying hyperparameters, including the number of layers, the filter region size, regularization parameters, and so on. It is currently known that those deep models are sensitive to the changes in these configurations for the task of classification for textual sentences.

Instead, CNN 308 is preferably a wide 3D convolutional neural network (CNN) for session-based recommendation with textual content feature. More preferably, CNN 308 learns the feature map by using only one convolution layer with more filters with varied, different strides for each dimension. Such an implementation of a CNN may require little hyperparameter tuning, but was found to achieve excellent results on different datasets.

As shown for CNN 308, preferably the model features a neural network 362 that includes one or more convolutional layers 364, but preferably only one convolutional layer 364, as well as inputs 310 and outputs 316.

Figure 4:
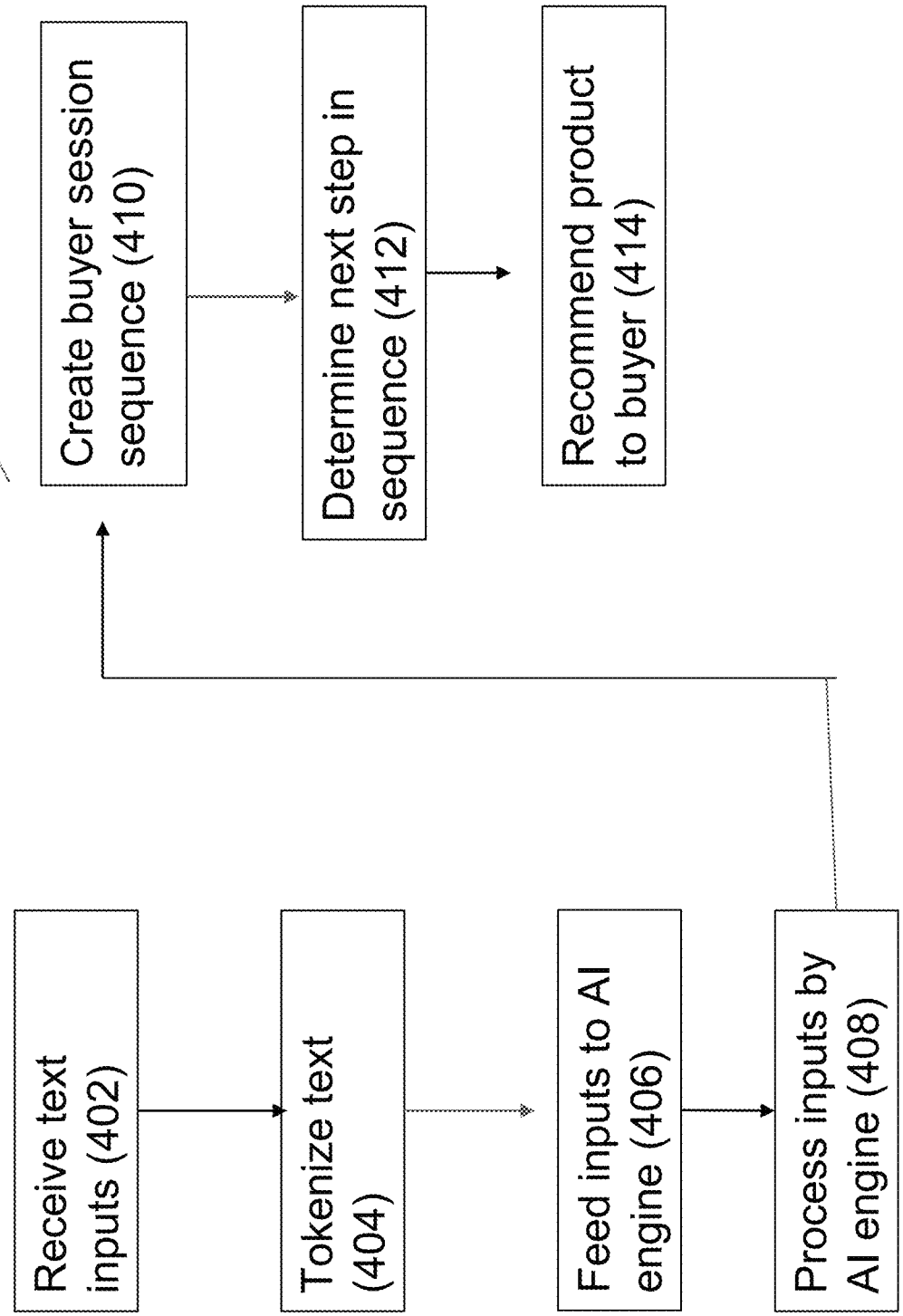
FIG. 4 shows a non-limiting, exemplary method for determining a next recommendation for a buyer session according to at least some embodiments.

FIG. 4 shows a non-limiting, exemplary method for determining a next recommendation for a buyer session according to at least some embodiments.

A first user inputs text at stage 402. This user is a customer, who wishes to purchase a good and/or service. At 404, the text is tokenized. Tokenization may be character based as described above. Given the initial description of the service by the user, it is possible to determine that only certain types of services are appropriate.

At 406 the inputs are fed into the AI engine 406. The AI engine may comprise a plurality of AI or machine learning algorithms. The inputs are processed by the AI system 408, which creates a buyer's session sequence at 410. The sequence may related to a single session or alternatively may include inputs from multiple sessions with that buyer, or at least with that buyer computational device. The next recommendation for the buyer's session is then determined at 412. A suggested product or service is then provided at 414.

Figure 5:
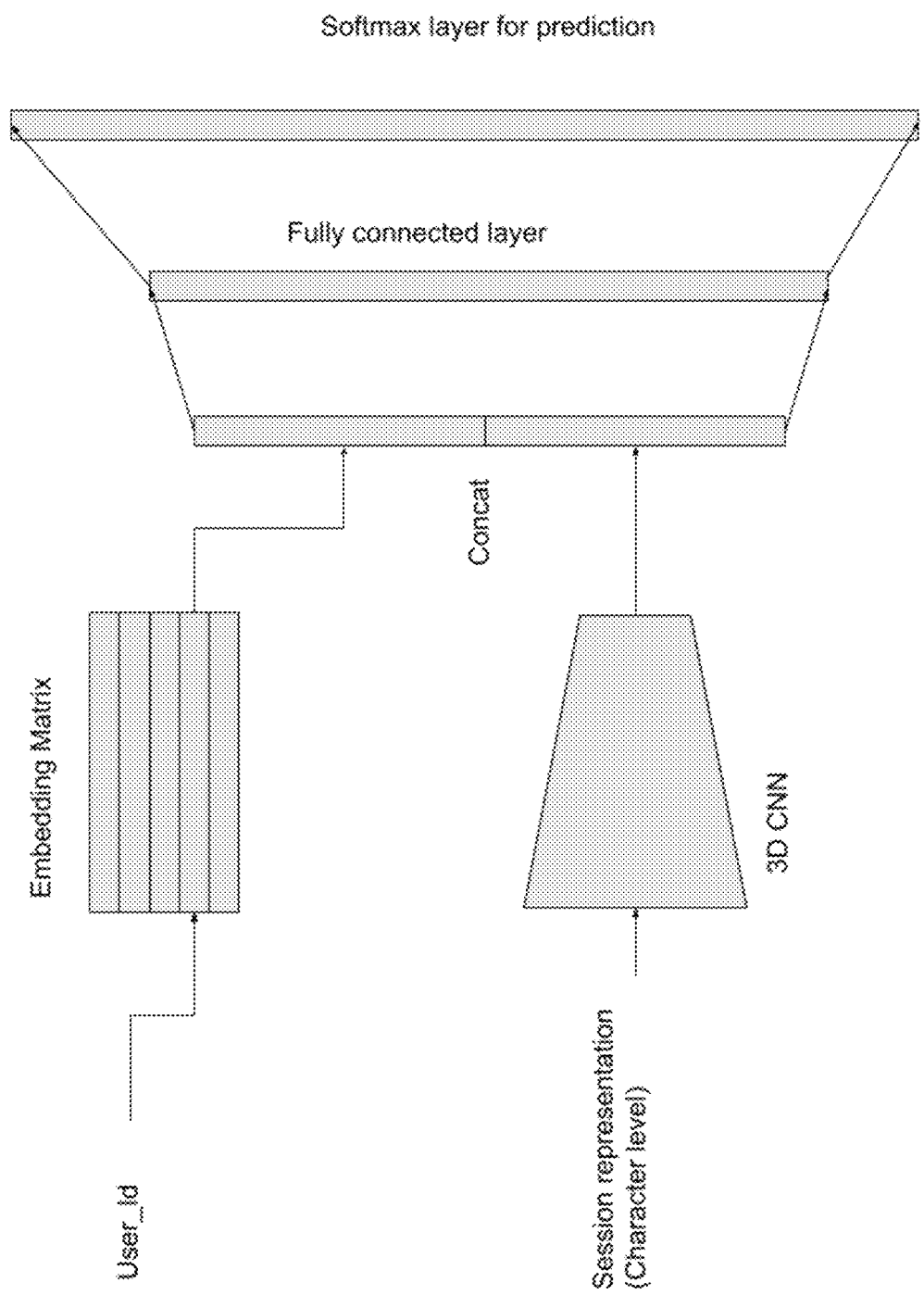
FIG. 5 shows a non-limiting, exemplary structure for adding user (buyer) behavior from previous sessions and/or user profile information to the previously described CNN, which may for example comprise a single convolutional layer CNN.

FIG. 5 shows a non-limiting, exemplary structure for adding user (buyer) behavior from previous sessions and/or user profile information to the previously described CNN, which may for example comprise a single convolutional layer CNN. As shown in a system 500, a user id is associated with user information 502, for example with regard to user behavior from previous sessions and/or user profile information. The previously described session representation 504 is also provided, preferably at the character level.

User information 502 is preferably fed to an embedding matrix 506, which supports embedding of the additional information to an AI model output 510, which may be the output of the previously described 3D CNN model for example. Session representation 504 is fed to AI model 508, to produce AI model output 510. For example, the embedding matrix 506 may be prepared by embedding the user vector, for example by looking up the user embedding matrix 506 from the user_id.

Figure 7:
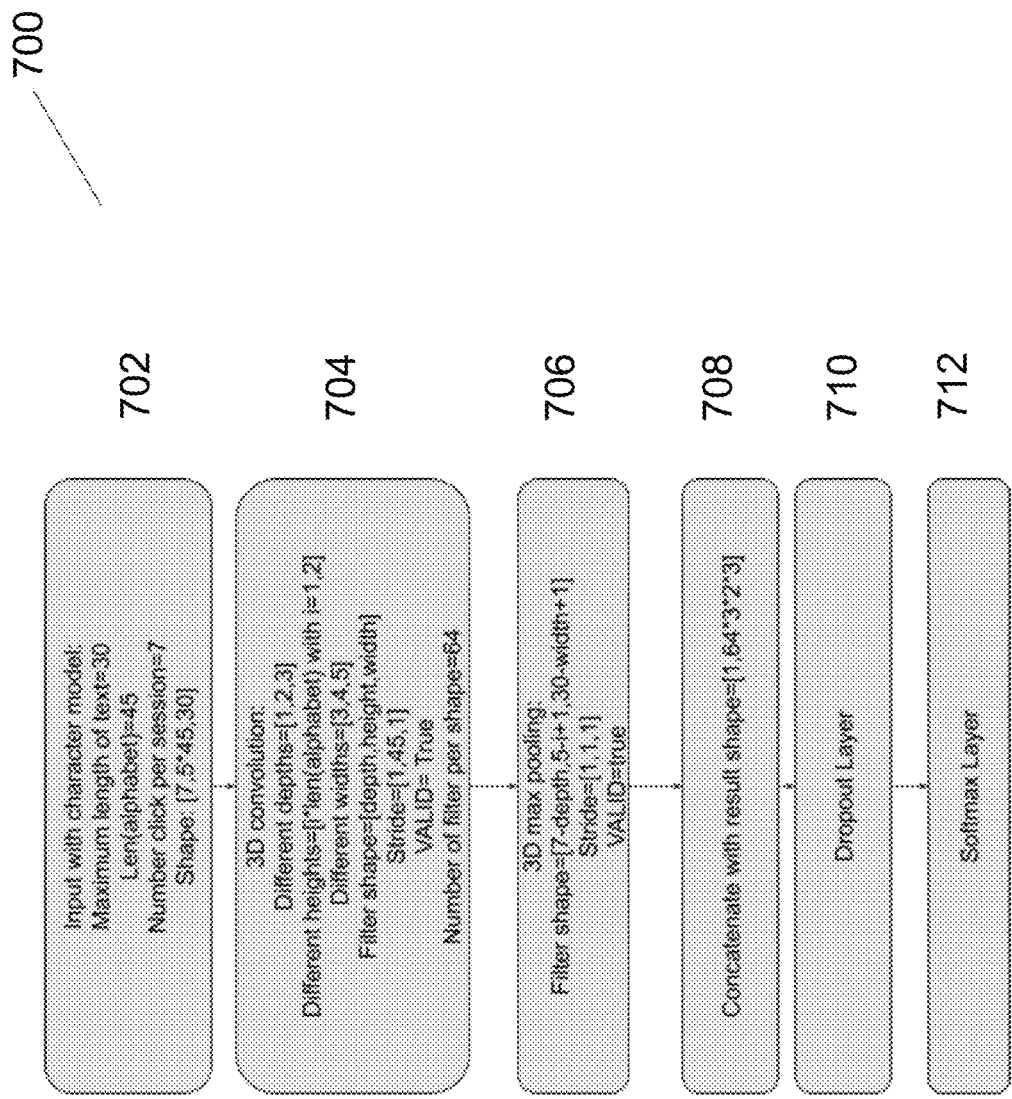
FIG. 7 shows an exemplary, non-limiting implementation of the layers from the model in FIG. 6 in more detail.

Next this embedding user vector is combined with AI model output 510 through a combining layer 512, to create the latent vector to predict which items to be recommended. Combining layer 512 may be a concatenation layer as shown. The embedding matrix is learnt to represent previous sessions, thus the embedding user vector represents the long term interest of user. It combines with the short-term interest from session to trade off the long term information vs short term information. Optionally combining layer 512 is placed after the dropout layer as shown in FIG. 7, but before an output layer 514, which may for example comprise a softmax layer as shown. A softmax layer may be used when a plurality of classes are possible as the output in a classification but a single class is to be output, as the softmax function provides a probability distribution over the plurality of classes.

Instead of embedding matrix 506, user information, such as previous session information may be fed directly to AI model 508. Optionally a single AI model 508 is used for both types of user information; alternatively, two separate AI models 508 are implemented, one for current session information and one for previous user information, such as previous session information. The output would then be fed to combining layer 512.

Figure 6:
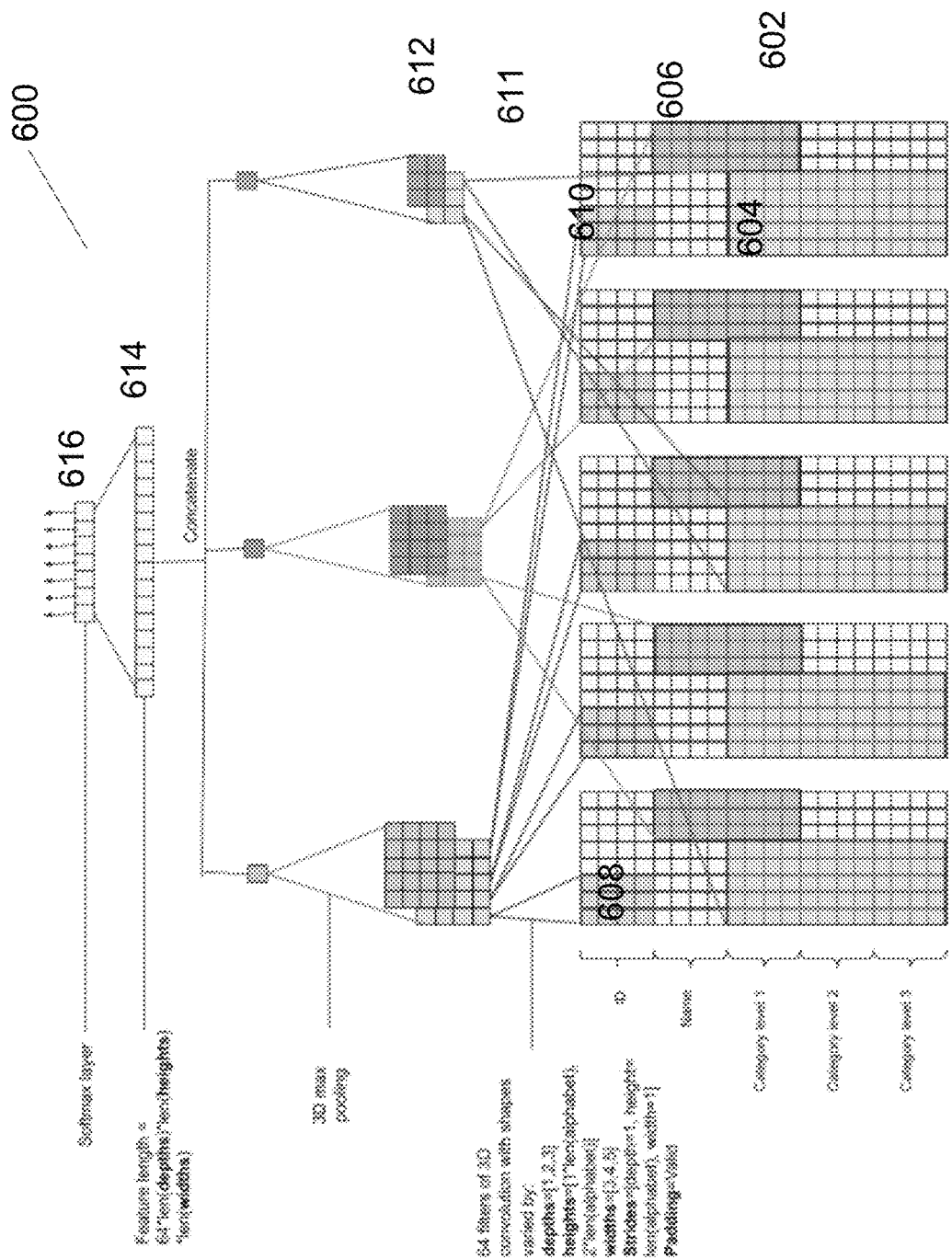
FIG. 6 shows a non-limiting, exemplary CNN model, preferably featuring only a single layer comprising different convolutional operations, which features a plurality of overlapping filters.

FIG. 6 shows a non-limiting, exemplary CNN model, preferably featuring only a single layer comprising different convolutional operations, which features a plurality of overlapping filters. As shown in a CNN model 600, a plurality of sequentially determined items 602 are considered as part of a session that is performed by the buyer over time, through the buyer computational device as previously described. Each sequentially determined item preferably has an id, a name and a plurality of applied hierarchical categories. A plurality of filters, of which four are shown as filters 604-610 are shown for the sake of discussion and without any intention of being limiting, are then applied to the item within the convolutional layer(s) as described in greater detail below. For this non-limiting exemplary implementation, a single convolutional layer 611 is preferably provided.

Filters 604-610 are preferably overlapping to capture multiple correlations or co-occurrence information for spatial-temporal interaction, such as for example various patterns in the data. The number of filters may be determined heuristically, for example through experimentation. In this non-limiting example, there are 64 or 84 filters in the 3D convolutional layer, which as noted above is preferably a single layer. The final number of filters is preferably determined per combination of depth, height, width value, providing for example 64 or 84 filters for each such combination. The purpose of this 3D convolution layer is to try to find the correlation between features across events. The 3D convolution layer has the filter shape determined as [depth, height, width]. The filters preferably have varying shapes, for example with depth equal to 1, 2 or 3; heights ranging from the length of the alphabet to twice the length of the alphabet; the widths equal to 3, 4 or 5; and strides having a depth equal to 1, a height equal to the length of the alphabet and a width equal to 1; preferably with VALID padding.

For example, preferably a single convolutional layer 611 is provided that comprises different convolutional operations by varying the filter shape. For example, as the filter shape is set to [depth, height, width], the filter shape can be varied by setting depth to one of three values:1 or 2 or 3, height: i* alphabet for i receive one of two values:1 or 2, the width can be one of three values: 4 or 5 or 6. One convolution operation is performed with a variant of the shape filter, which is then followed by one 3D max pooling with the filter shape of [7-depth,5-i+1, 30-width+1] to reduce the data dimension to 1.

The output of the filters is preferably then pooled through 3D max pooling 612 as shown, to detect the major pattern within the data. The stride for the 3D max pool is preferably varied to reduce the data dimension to 1.

The pooled data is preferably concatenated through a concatenation layer 614, which is then fed to a softmax layer 616.

FIG. 7 shows an exemplary, non-limiting implementation of the layers from the model in FIG. 6 in more detail. A set of layers 700 preferably includes a buyer input processing layer 702, which as noted previously, preferably converts the input to a character based structure. Some optional parameters include keeping the maximum length of the text to 30 and the length of the alphabet to 45, for better processing. Optionally, a single session may be limited to 7 user inputs, such as clicks for example. These parameters would lead to a shape of [depth=7, height=5*45, width=30].

The model preferably features a single convolutional layer 704 as shown, with parameters as previously described. In this non-limiting example, the number of filters is set to 64.

A 3D max pooling layer 706 preferably has a filter shape of [7-depth,5-i+1, 30-width+1] because the filter shape for previous 3D convolutional operation is [depth, i*size of alphabet, width]; with stride equal to [1,1,1] and the VALID parameter set to true. Concatenation is preferably performed at the concatenation layer 708 with the resultant shape [1, 64*3*2*3].

To avoid overfitting, some neuronal output is dropped at a dropout layer 710. The previously described softmax layer 712 is then applied.

For training of the model shown in FIGS. 6 and 7, optionally an Adam optimizer with a learning rate of 0.001 is applied. L2 regularization with a value of 0.00001 may also be applied. A dropout technique with kept output probability of 0.2 is optionally used. In addition, the weights are preferably initialized with a truncated Gaussian, having a mean of 0 and a standard deviation of 0.1.

When the above optional parameters and training were applied, the model was tested against the experiment for two proprietary datasets: JEWELLERY and ELECTRIC. The first dataset consists of product view events of a website selling jewellery products whereas the second dataset consists of product viewing clicks of a website selling electronics products The model was compared with baseline models as follows:

Item-based KNN (described in the paper by Greg Linden, Brent Smith, Jeremy York. Amazon.com recommendations: Item-to-item collaborative filtering. In IEEE Internet computing, 2003). This is a simple method, which is widely deployed in practice. In this method, two items are considered similar if they co-occur frequently in different sessions. Because the problem is to predict subsequent add-to-cart events, the similarity is calculated between each item and only add-to-cart items. In prediction, the method outputs top-N items, which are most similar to the current clicked one.

ID-RNN (described in the paper by Balázs Hidasi, Alexandros Karatzoglou, Linas Baltrunas, Domonkos Tikk. Session-based Recommendations with Recurrent Neural Networks. ICLR (Poster) 2016). This method uses RNN to model session clicks and require only item IDs. The method was originally reported to deliver substantial improvement over Item-based KNN. The implementation provided by the authors ID-RNN with default parameters was used (https://github.com/hidasib/GRU4Rec). ID-RNN can be trained to predict next add-to-cart items by using such items as training labels.

Content-RNN (described in the paper by Balázs Hidasi, Massimo Quadrana, Alexandros Karatzoglou, Domonkos Tikk. Parallel Recurrent Neural Network Architectures for Feature-rich Session-based Recommendations. RecSys 2016). This method, proposed by the authors of ID-RNN, also uses RNN but extends the model to consider textual descriptions of items and associated images, in addition to IDs as in ID-RNN.

Deep 3D CNN with content (described in the paper by Trinh Xuan Tuan and Tu Minh Phuong. 3 D Convolutional Networks for Session-based Recommendation with Content Features. RecSys 2017). This method employs Deep 3D CNN with textual content.

The results are shown below in Tables 1 and 2, demonstrating the superiority of the current model. MRR is Mean reciprocal rank (shown in https://en.wikipedia.org/wiki/Mean_reciprocal_rank).

TABLE 1

JEWELLERY

|  | Top 5 | | Top 10 | | Top 20 | |
| --- | --- | --- | --- | --- | --- | --- |
|  | Recall | MRR | Recall | MRR | Recall | MRR |
| Item based KNN | 0.15012 | 0.10324 | 0.19613 | 0.1103 | 0.27704 | 0.11620 |
| ID-RNN | 0.15387 | 0.10282 | 0.22339 | 0.11381 | 0.2867 | 0.11851 |
| Content RNN | 0.1860 | 0.098329 | 0.241131 | 0.106335 | 0.318719 | 0.112002 |
| Deep 3D CNN with features | 0.194549 | 0.104850 | 0.243582 | 0.112439 | 0.309345 | 0.117001 |
| Wide 3D CNN features | 0.202048 | 0.096976 | 0.265359 | 0.107484 | 0.336746 | 0.112687 |

TABLE 2

ELECTRIC

|  | Top 5 | | Top 10 | | Top 20 | |
| --- | --- | --- | --- | --- | --- | --- |
|  | Recall | MRR | Recall | MRR | Recall | MRR |
| Item based KNN | 0.288781 | 0.212834 | 0.364958 | 0.224361 | 0.417590 | 0.228896 |
| ID-RNN | 0.302631 | 0.213065 | 0.381578 | 0.225117 | 0.454986 | 0.230755 |
| Content RNN | 0.358726 | 0.214716 | 0.427978 | 0.215521 | 0.509003 | 0.221800 |
| Deep 3D CNN with feature | 0.361496 | 0.215316 | 0.423823 | 0.225561 | 0.491690 | 0.231116 |
| Wide 3D CNN with Features | 0.394737 | 0.226200 | 0.463296 | 0.239248 | 0.554709 | 0.245493 |

Figure 8:
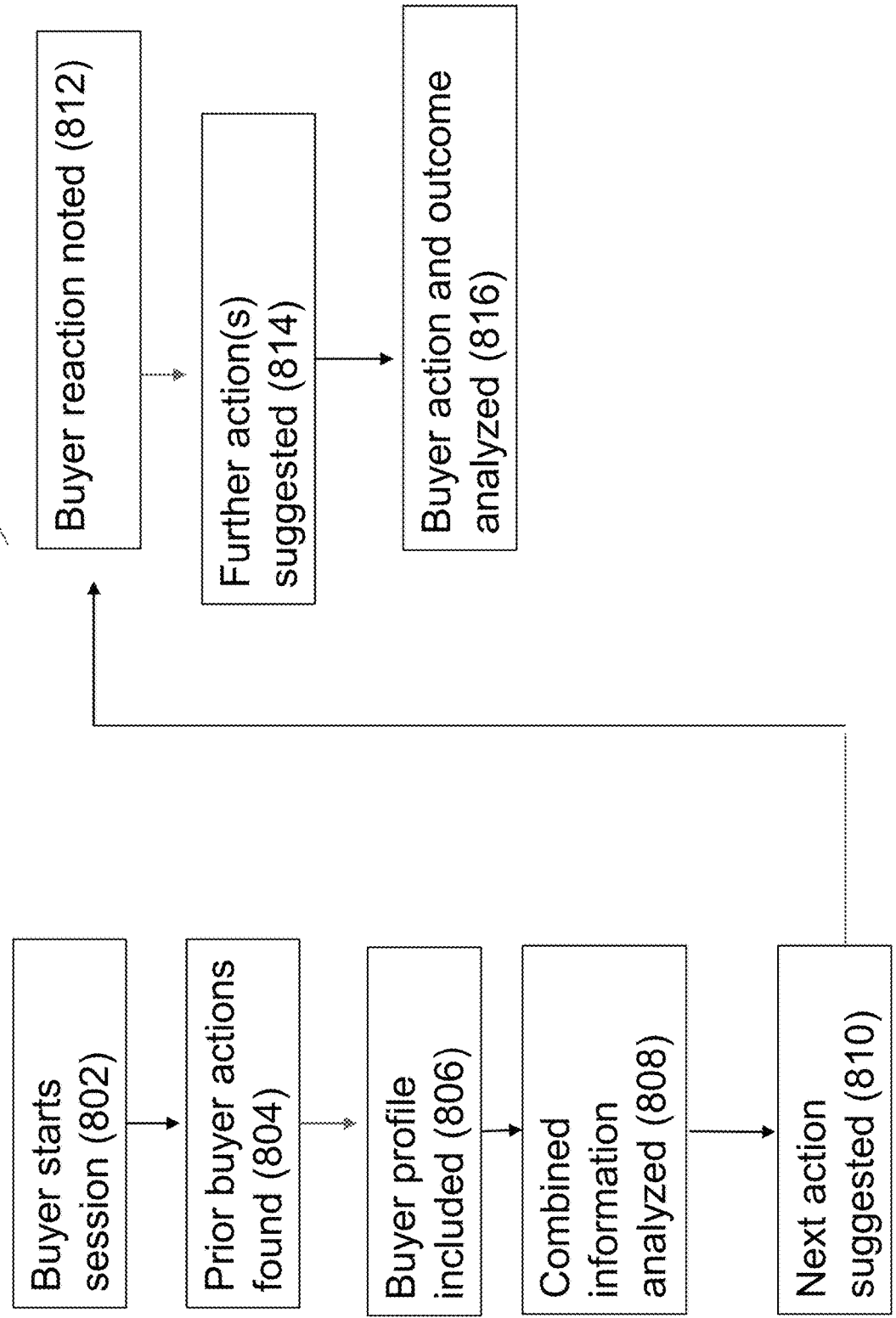
FIG. 8 shows a non-limiting, exemplary method of a buyer session that is analyzed with combined information, optionally using any of the previously described models.

FIG. 8 shows a non-limiting, exemplary method of a buyer session that is analyzed with combined information, optionally using any of the previously described models. At 802, the buyer starts a session as previously described. At 804, the system determines that prior buyer actions are available, whether through a fully identified buyer session or from a pseudonymous buyer session. If the buyer is fully identified, for example by logging into the system, then at 806 optionally a buyer profile is located and its information is included. The combined information is analyzed at 808. A next action or other suggestion is provided to the buyer at 810, as previously described. The buyer's reaction to the action or suggestion is noted at 812. Further action(s) and/or suggestion(s) may be provided at 814, further incorporating the buyer's reaction, the overall session, and preferably also the previously obtained buyer session and/or profile information. At 816, the buyer's actions and outcome are preferably analyzed at the end of the session.

Figure 9:
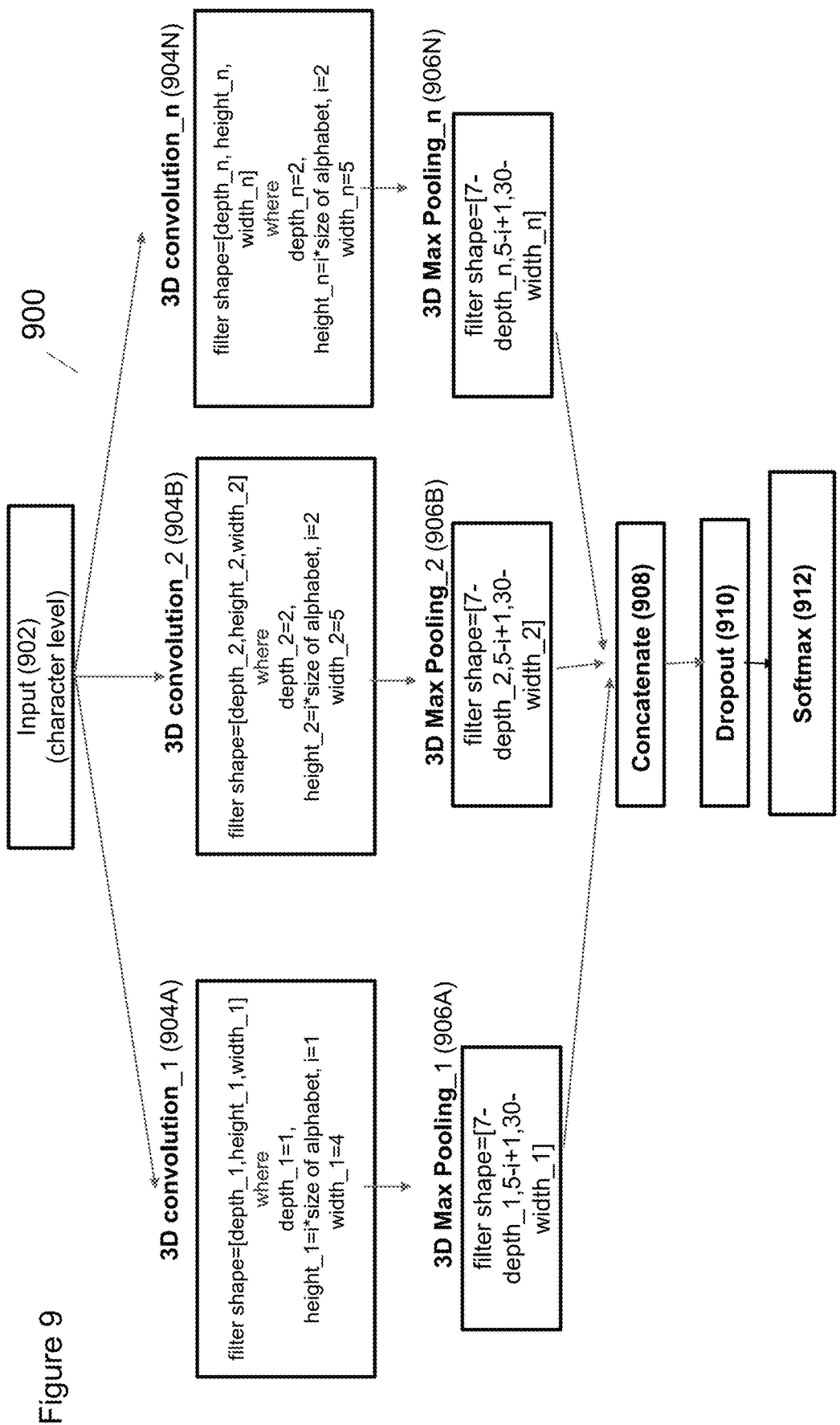
FIG. 9 shows a non-limiting, exemplary process, which may be implemented with the system of FIG. 6 for example.

FIG. 9 shows a non-limiting, exemplary process, which may be implemented with the system of FIG. 6 for example. As shown in a process 900, the process starts by providing input at 902, preferably at the character level. Next a plurality of filters are applied at the convolutional layer level, preferably through a single 3D convolutional layer as described above, at 904. Each filter is separately applied in a sub-step, shown as 904A, 904B and so forth, through 904N, corresponding to filters 1 through N. As non-limiting examples, a variety of filter shapes may be applied, subject to the above described rules.

For example, the application of the filter at 904A, shown as 3D convolution_1, preferably comprises: filter shape having [depth_1,height_1,width_1], where depth_1=1, height_1=i*size of alphabet, i=1 and width_1=4. The application of the filter at 904B, shown as 3D convolution_2, preferably comprises: filter shape having [depth_2,height_2, width_2] where depth_2=2, height_2=i*size of alphabet, i=2 and width_2=5. The application of the filter at 904N, shown as 3D convolution_N, preferably comprises: filter shape having [depth_n, height_n, width_n], where depth_n=2, height_n=i*size of alphabet, i=2 and width_n=5.

Next a plurality of max pooling filters are applied at the max pooling level, at 906. Each max pooling filter is separately applied in a sub-step, shown as 906A, 906B and so forth, through 906N, corresponding to max pooling filters 1 through N. As non-limiting examples, a variety of filter shapes may be applied, subject to the above described rules.

For example, the application of the filter at 906A, shown as 3D Max Pooling_1, preferably comprises: filter shape having [7-depth_1,5-i+1,30-width_1]. The application of the filter at 906B, shown as 3D Max Pooling_2, preferably comprises: filter shape having [7-depth_2,5-i+1,30-width_2]. The application of the filter at 906N, shown as 3D Max Pooling_N, preferably comprises: filter shape having [7-depth_n,5-i+1,30-width_n].

Concatenation is preferably performed at 908, thereby constraining the output to the desired filter shape. For example and without limitation, as described in FIG. 7, the resultant shape may comprise [1, 64*3*2*3]. To prevent overfitting and as previously described, dropout is preferably performed at 910. A softmax layer is then preferably applied at 912 as previously described.

Figure 10:
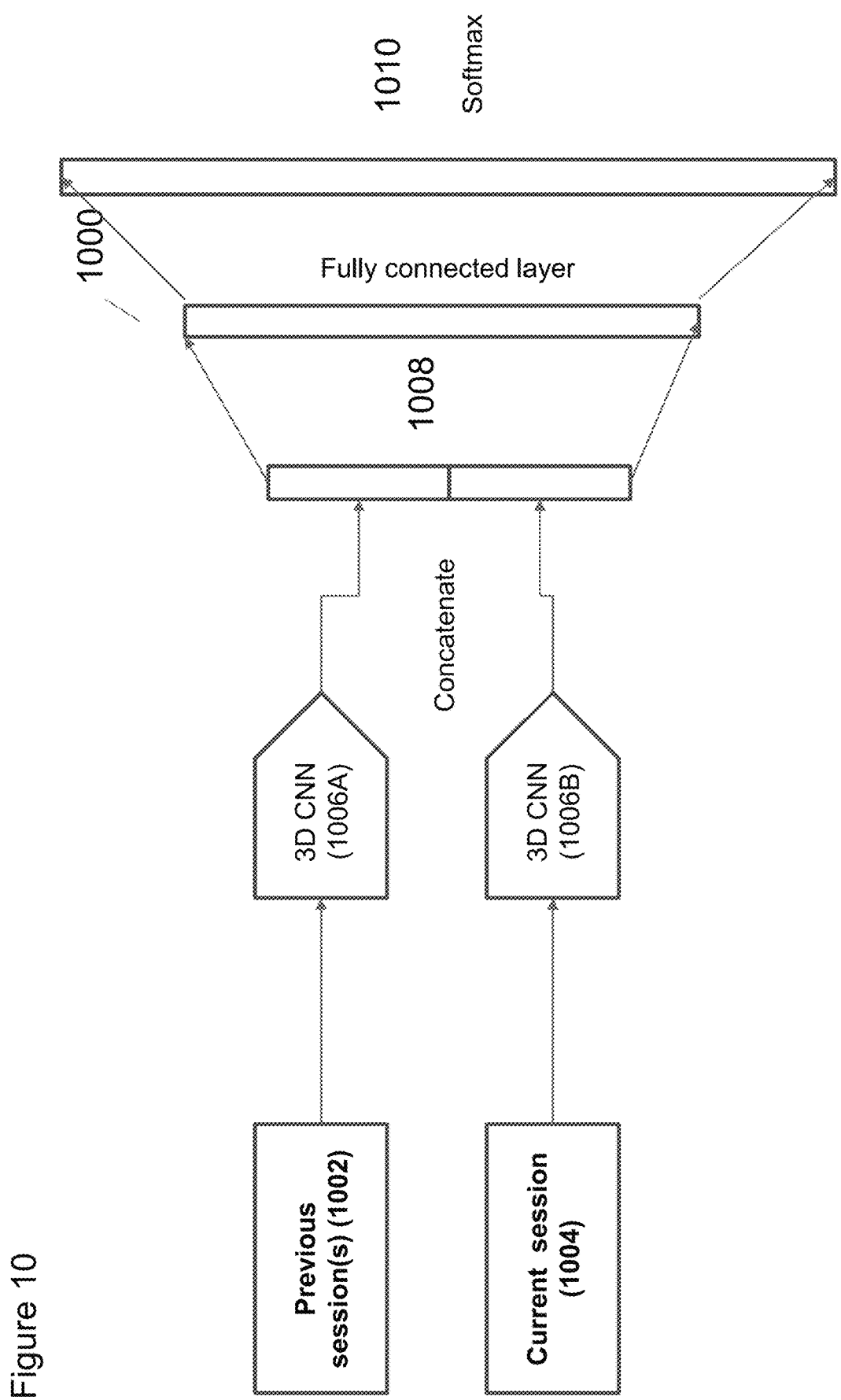
FIG. 10 relates to a non-limiting example of a system for incorporating user data from a previous user session with 3D CNN.

FIG. 10 relates to a non-limiting example of a system for incorporating user data from a previous user session with 3D CNN. As shown in a system 1000, data from one or more previous user session(s) 1002, plus data from a current (real-time) user session 1004, are input. In this non-limiting example, both types of data are input to a 3D CNN, which may be a single CNN or a plurality of CNNs, shown as 3D CNN 1006A and 1006B for the sake of illustration only and without any intention of being limiting. Each such 3D CNN 1006 may be configured as previously described. Next the output from the one or more 3D CNNs 1006, such as 3D CNN 1006A and 1006B as shown, is fed to a concatenation layer 1008. Concatenation layer 1008 may feature one or more concatenation processes, and may be implemented as previously described. The output from concatenation layer 1008 is then preferably fed to a softmax layer 1010 as previously described.

Figure 11:
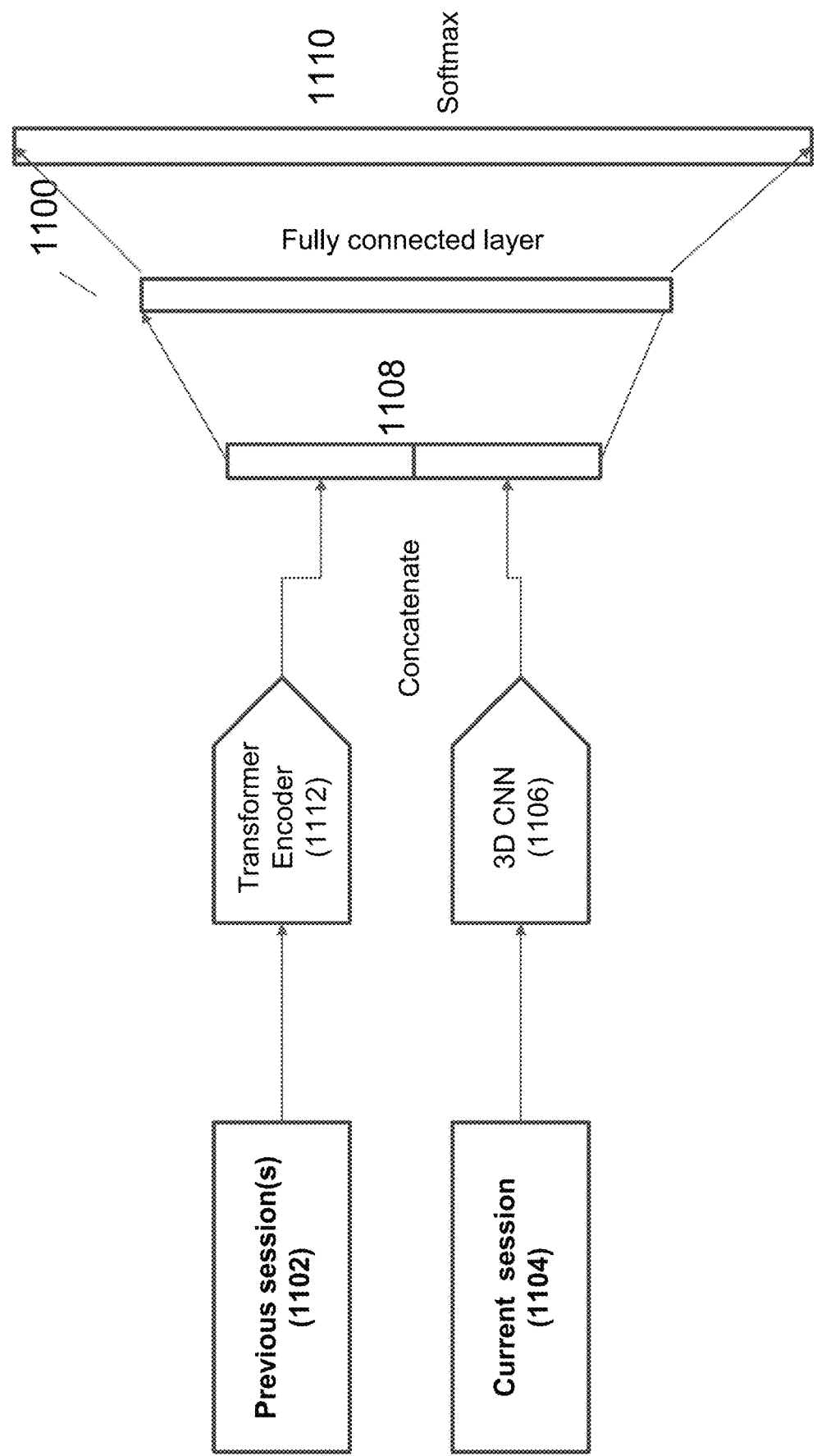
FIG. 11 shows another non-limiting example of a system for incorporating user data from a previous user session with 3D CNN.

FIG. 11 shows another non-limiting example of a system for incorporating user data from a previous user session with 3D CNN. This non-limiting example differs in that previous user session data is fed through a transformer encoder rather than through a 3D CNN, as for FIG. 10.

As shown in a system 1100, data from one or more previous user session(s) 1102, plus data from a current (real-time) user session 1104, are input. In this non-limiting example, data from the current user session 1104 is input to a 3D CNN 1106. 3D CNN 1106 may be configured as previously described. Previous user session data 1102 is input to a transformer encoder 1112 for token based (rather than character based) analysis. The encoder may be taken from any suitable transformer model. Transformer models that are known in the art require both encoders and decoders for providing a final output, but in this non-limiting embodiment, the encoder is used alone for incorporating previous user session data 1102. The encoder is able to encode the previous session into a latent vector, so that it can be concatenated with the latent vector from the current user session to reach a decision, for example regarding further recommendations. A non-limiting example of the architecture for transformer encoder 1112 is shown with regard to FIG. 12.

Next the output from 3D CNN 1106 and transformer encoder 1112 is fed to a concatenation layer 1108. Concatenation layer 1108 may feature one or more concatenation processes, and may be implemented as previously described. The output from concatenation layer 1108 is then preferably fed to a softmax layer 1110 as previously described.

Figure 12:
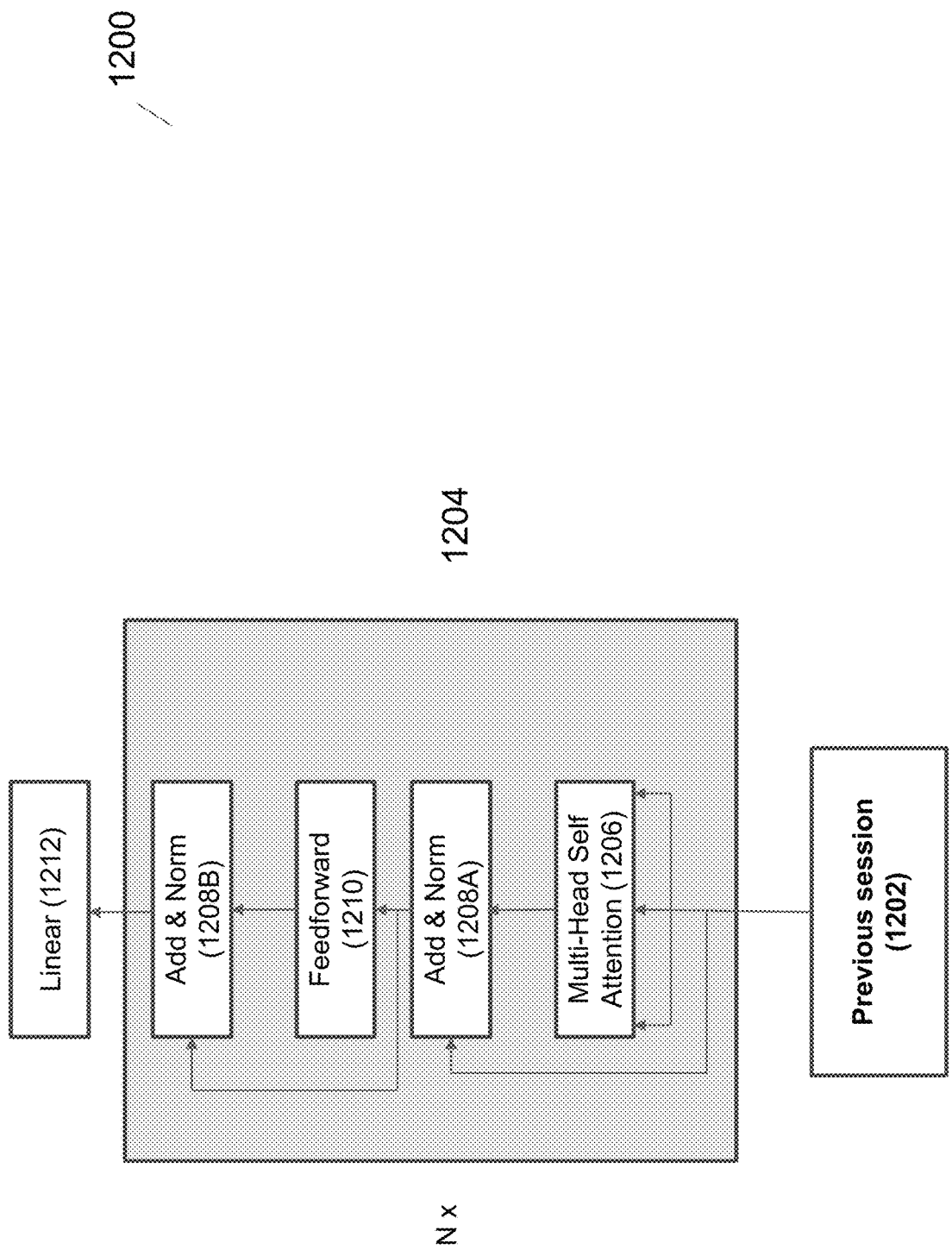
FIG. 12 shows a non-limiting example of the architecture for a transformer encoder.

FIG. 12 shows a non-limiting example of the architecture for a transformer encoder. As shown in a transformer encoder system 1200, previous session data 1202 is fed to an encoder 1204. Encoder 1204 features Multi-Head Self Attention layer 1206 for receiving previous session data 1202. The self attention layer considers the effect of context (surrounding words according to their positions in the input sequence) for each input word. Multi-Head Self Attention layer 1206 comprises a plurality of attention layers running in parallel. Each attention layer may for example comprise a scaled dot-product attention layer.

Both the outputs of Multi-Head Self Attention layer 1206 and the initial input to encoder 1204 are provided to an Add & Norm 1208A, with a residual connection. Add & Norm 1208A performs combines the outputs from Multi-Head Self Attention layer 1206 and then applies layer normalization to these outputs. The output from Add & Norm 1208A is preferably provided both to a feedforward neural network 1210 and to an Add & Norm 1208B as shown. Add & Norm 1208B operates as previously described for Add & Norm 1208A. Next the output of Add & Norm 1208B forms the output of encoder 1204.

The output of encoder 1204 is fed to a linear layer 1212, which is a neural network that converts the output vector to a word. Encoder 1204 may be implemented for example as described with regard to the paper by Vaswani et al (Attention Is All You Need. NIPS 2017).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for analyzing online temporal interactions of a user, the system comprising a user computational device for operation by the user, a server for analyzing said online temporal interactions of the user and a computer network for connecting the user computational device to the server, wherein said user computational device comprises a user interface for receiving user actions and for displaying content to the user, said server comprises a recommendation engine for analyzing said user actions and for recommending additional content for provision to said user interface; wherein said recommendation engine comprises a plurality of models, comprising a first model for analyzing a current online behavior of the user arranged in a session, and a second model for analyzing past online behavior of the user, wherein said recommendation engine concatenates outputs of both models to a single output, to determine additional content for display through said user interface; wherein said server comprises a memory for storing a plurality of instructions for operating said recommendation engine and a processor for executing said plurality of instructions; wherein said first model comprises a CNN (Convolution Neural Network), wherein said CNN comprises a plurality of overlapping filters having different filter shapes and wherein said CNN has a single 3D convolution layer only, such that said plurality of overlapping filters having different filter shapes are all present in said single layer; wherein said CNN receives each character in a time sequence during said session; wherein said output of said single 3D convolution layer is fed to a 3D max pooling layer, wherein said second model comprises a transformer-based model, wherein said transformer-based model comprises an encoder alone, without a decoder; wherein said transformer-based model receives a plurality of tokens corresponding to said past online behavior of the user; wherein said recommendation engine concatenates outputs of both models to a single output through a concatenation layer;

further comprising training said CNN by receiving data comprising data obtained from current online behavior of the user comprising actions taken by the user in a current session;

preprocessing said data to remove noise; feeding said data to said CNN character by character; then applying an Adam optimizer and L2 regularization, after first initializing weights for said CNN with a truncated Gaussian;

further comprising training said transformer-based model by receiving data comprising data obtained from past online behavior of the user, comprising actions taken by the user in a previous session; preprocessing said data to remove noise; tokenizing said data and feeding said tokenized data to said transformer-based model.

2. The system of claim 1, wherein said online commerce comprises an online system for purchasing goods and/or services.

3. The system of claim 2, wherein said online system comprises one or more of an online marketplace, a system for purchasing physical goods, digital goods, media and other content, and services, whether provided digitally or physically, or a combination thereof.

4. The system of claim 3, wherein said user computational device communicates with said server in a session and wherein the current online behavior of the user comprises actions taken by the user in a current session.

5. The system of claim 3, wherein said actions taken by the user in said current session comprise one or more of clicking on an item, staying on a page showing the item or a collection of items, placing the item in a shopping cart, and indicating the item for a wish list or otherwise for future access (short of purchase); wherein each item comprises a good and/or service with which the user interacted during the session.

6. The system of claim 5, wherein said recommendation engine operates according to an item id (identifier), an item name and an item category or categories, determined according to said actions.

7. The system of claim 5, wherein said actions taken by the user in said current session comprise one or more of clicking on a specific category page or other category grouping, or performing a search through content provided by said server to said user inter face.

8. The system of claim 7, wherein said recommendation engine records actions taken by the user in each current session.

9. The system of claim 8, wherein said past online behavior of the user comprises information about the user, apart from actions taken by the user in a current or previous session.

10. The system of claim 9, wherein said past online behavior of the user comprises one or more of a record of a previous purchase by the user, a profile of the user or a combination thereof.

11. The system of claim 1, wherein said user computational device comprises a memory for storing a plurality of instructions for operating said user interface and a processor for executing said plurality of instructions.

12. The system of claim 1, wherein an output of said concatenation layer comprises a plurality of classes and is fed to a softmax to determine a probability distribution of said plurality of classes for selecting a class with a highest probability.

13. The system of claim 12, wherein said second model for analyzing past online behavior of the user outputs an embedding matrix, wherein said embedding matrix is prepared by embedding a user vector representing previous online behavior of the user.

14. The system of claim 13, wherein said concatenation layer is placed after a dropout layer but before an output layer for outputting said recommendation.

15. The system of claim 1, wherein Adam optimizer is applied with a learning rate of 0.001; said L2 regularization is applied with a value of 0.00001; and said truncated Gaussian has a mean of 0 and a standard deviation of 0.1.

16. The system of claim 1, wherein said tokenized data is converted to a vector before being fed to said transformer-based model.

17. The system of claim 16, wherein said transformer-based model receives said plurality of tokens corresponding to said past online behavior of the user if data corresponding to past online behavior of the user is available; if said data is not available, textual meta-data is provided to said CNN to overcome a cold start problem for analyzing online behavior of the user in a current session.

18. A system for analyzing online temporal interactions of a user to predict a next action of the user, the system comprising a user computational device for operation by the user, a server for analyzing said online temporal interactions of the user and a computer network for connecting the user computational device to the server, wherein said user computational device comprises a user inter face for receiving user actions and for displaying content to the user, said server comprises a prediction engine for analyzing said user actions and for predicting a next action by said user: wherein said prediction engine comprises a plurality of models, comprising a first model for analyzing a current online behavior of the user arranged in a session, and a second model for analyzing past online behavior of the user, wherein said prediction engine concatenates outputs of both models to a single output, to determine additional content for display through said user interface; wherein said server comprises a memory for storing a plurality of instructions for operating said prediction engine and a processor for executing said plurality of instructions; wherein said first model comprises a CNN (Convolution Neural Network), wherein said CNN comprises a plurality of overlapping filters having different filter shapes and wherein said CNN has a single 3D convolution layer only, such that said plurality of overlapping filters having different filter shapes are all present in said single layer; wherein said CNN receives each character in a time sequence during said session; wherein said output of said single 3D convolution layer is fed to a 3D max pooling layer; wherein said second model comprises a transformer-based model, wherein said transformer-based model comprises an encoder alone, without a decoder; wherein said transformer-based model receives a plurality of tokens corresponding to said past online behavior of the user; wherein said prediction engine concatenates outputs of both models to a single output through a concatenation layer; wherein said output of said prediction engine is applied to automatically update a user interface for display to the user.

19. The system of claim 18, wherein said transformer-based model receives said data corresponding to said past online behavior of the user if data corresponding to past online behavior of the user is available; if said data is not available, textual meta-data is provided to said CNN to overcome a cold start problem for analyzing online behavior of the user in a current session.

20. The system of claim 18, wherein said transformer-based model is trained by tokenizing said data; and feeding said tokenized data to said transformer-based model.

21. The system of claim 20, wherein said tokenized data is converted to a vector before being fed to said transformer-based model.

22. The system of claim 21, wherein a plurality of vectors are provided as a user embedding matrix for training said transformer-based model.

23. A system for analyzing online temporal interactions of a user to automatically update a user interface for display to the user, the system comprising a user computational device for operation by the user, a server for analyzing said online temporal interactions of the user and a computer network for connecting the user computational device to the server, wherein said user computational device comprises a display for displaying said user interface, wherein said user interface displays content to the user, said server comprises a recommendation engine for analyzing said user actions and for updating said user interface according to said analyzing; wherein said recommendation engine comprises a plurality of models, comprising a first model for analyzing a current online behavior of the user arranged in a session, and a second model for analyzing past online behavior of the user, wherein said recommendation engine concatenates outputs of both models to a single output, and then updates said user interface according to said single output; wherein said server comprises a memory for storing a plurality of instructions for operating said recommendation engine and a processor for executing said plurality of instructions; wherein said first model comprises a CNN (Convolution Neural Network), wherein said CNN comprises a plurality of overlapping filters having different filter shapes and wherein said CNN has a single 3D convolution layer only, such that said plurality of overlapping filters having different filter shapes are all present in said single layer; wherein said CNN receives each character in a time sequence during said session; wherein said output of said single 3D convolution layer is fed to a 3D max pooling layer; wherein said second model comprises a transformer-based model, wherein said transformer-based model comprises an encoder alone, without a decoder; wherein said transformer-based model receives a plurality of tokens corresponding to said past online behavior of the user if data corresponding to past online behavior of the user is available; if said data is not available, providing textual meta-data to said CNN to overcome a cold start problem for analyzing online behavior of the user in a current session; wherein said recommendation engine concatenates outputs of both models to a single output through a concatenation layer.

24. The system of claim 23, further comprising training said CNN by receiving data comprising data obtained from past online behavior of the user, comprising actions taken by the user in a previous session; preprocessing said data to remove noise; then feeding each said character in said time sequence during a previously recorded user session to said CNN.

25. The system of claim 24, wherein said CNN is trained by applying an Adam optimizer and L2 regularization, after first initializing weights for said CNN with a truncated Gaussian.

26. The system of claim 25, wherein said Adam optimizer is applied with a learning rate of 0.001; said L2 regularization is applied with a value of 0.00001; and said truncated Gaussian has a mean of 0 and a standard deviation of 0.1.

27. The system of claim 24, wherein said transformer-based model is trained by tokenizing said data; and feeding said tokenized data to said transformer-based model.

28. The system of claim 21, wherein said tokenized data is converted to a vector before being fed to said transformer-based model.

* * * * *